(12) United States Patent  
Wiseman

(10) Patent No.: US 9,003,536 B2  
(45) Date of Patent: Apr. 7, 2015

(54) CONTENT-CHECKING OF EMBEDDED CONTENT IN DIGITALLY ENCODED DOCUMENTS

(75) Inventor: Simon Robert Wiseman, Worcestershire (GB)

(73) Assignee: Qinetiq Limited (GB)

( * ) Notice: Subject to any disclaimer, the term of this patent is extended or adjusted under 35 U.S.C. 154(b) by 24 days.

(21) Appl. No.: 13/700,256

(22) PCT Filed: May 19, 2011

(86) PCT No.: PCT/GB2011/000760  
§ 371 (c)(1),  
(2), (4) Date: Nov. 27, 2012

(87) PCT Pub. No.: WO2011/148122  
PCT Pub. Date: Dec. 1, 2011

(65) Prior Publication Data  
US 2013/0067584 A1    Mar. 14, 2013

(30) Foreign Application Priority Data  
May 27, 2010    (GB) .................................. 1008868.0

(51) Int. Cl.  
*G06F 21/00* (2013.01)  
*G06F 21/56* (2013.01)

(52) U.S. Cl.  
CPC .................................... *G06F 21/562* (2013.01)

(58) Field of Classification Search  
None  
See application file for complete search history.

(56) References Cited

U.S. PATENT DOCUMENTS

| | | |
|---|---|---|
| 5,951,698 A | 9/1999 | Chen et al. |
| 6,594,686 B1 | 7/2003 | Edwards et al. |
| 6,697,950 B1 | 2/2004 | Ko |
| 7,243,373 B2 * | 7/2007 | Muttik et al. .................... 726/24 |
| 7,958,554 B2 * | 6/2011 | Chow et al. ...................... 726/22 |
| 2003/0023864 A1 | 1/2003 | Muttik et al. |
| 2005/0268341 A1 * | 12/2005 | Ross ................................ 726/26 |
| 2007/0277238 A1 * | 11/2007 | Margalit et al. ................. 726/22 |
| 2010/0064369 A1 * | 3/2010 | Stolfo et al. ..................... 726/24 |
| 2010/0175133 A1 * | 7/2010 | Ness et al. ....................... 726/23 |

FOREIGN PATENT DOCUMENTS

| | | |
|---|---|---|
| EP | 1727067 | 11/2006 |
| GB | 2357939 | 7/2001 |
| GB | 2444514 | 6/2008 |
| WO | WO 2005/085971 | 9/2005 |

* cited by examiner

*Primary Examiner* — Samson Lemma  
*Assistant Examiner* — Malcolm Cribbs  
(74) *Attorney, Agent, or Firm* — McDonnell Boehnen Hulbert & Berghoff LLP

(57) ABSTRACT

Methods and apparatus for network security content-checking, in particular simplifying the critical element of a content-checker so that it can be trusted and implemented in hardware logic. A method comprises determining whether a digitally encoded document contains any embedded documents; content-checking, by means of at least one hard-ware-implemented content-checker, at least one of the embedded documents separately from those parts of the digitally encoded document within which it was embedded; and releasing a version of the digitally encoded document responsive to the content-checking.

12 Claims, 2 Drawing Sheets

CONTENT-CHECKING OF EMBEDDED CONTENT IN DIGITALLY ENCODED DOCUMENTS

FIELD OF THE INVENTION

The present invention relates to apparatus, methods, and programs for a computer for content-checking of embedded content in digitally encoded documents and systems incorporating the same.

BACKGROUND TO THE INVENTION

When digitally encoded documents (for example in Microsoft Word, PowerPoint, Excel or other data formats) are passed between systems, content-checking is often applied to ensure that such documents do not represent a security threat: for example either do not leak sensitive information from the source system or do not carry attacks against the destination system, or both.

Content-checking is a well-known technique found in the many mainstream anti-virus and Data Leakage Protection products that are commercially available, as well as more specialist products such as those provided by Compucat. Such content-checkers are generally able to check a document and any other documents that may be embedded or contained within it. For example, where a picture is embedded in a spreadsheet, the content-checkers will check the spreadsheet and extract the picture and check that as well.

A known problem with content-checking is that the data structures used in common documents are complex and may be applied recursively and nested to several levels. This complexity is often introduced in order to minimise the space needed to represent a document or to make it easier for the application program to load or modify the document.

As a result of this complexity known content-checkers are themselves complex. Typically such content-checkers are implemented in software since the complexity of data structures which are nested and recursive structures are difficult to handle in hardware logic. The situation is made worse by the need to handle embedded content—potentially of a document type distinct from that of the enclosing document (for example a spreadsheet embedded within a slide presentation document)—and to support the modification of document structures by the content-checker itself. As a result it is difficult to produce an implementation which can be highly trusted and is high performance.

There are two known strategies for handling embedded data in a content-checker: the first is to recursively invoke a content-checker when embedded data is encountered; the other is to report embedded content to a controlling framework for later checking.

The recursive strategy is relatively straightforward to implement in software and works fast, because the embedded data can be worked on immediately it is encountered. It is also straightforward to allow such a checker to modify the data, since the checker for the outer "containing" document is in a position directly to replace original embedded data with a modified version in its output stream. This technique is used in mainstream content-checking products directed to removing viruses from documents.

The alternative strategy of reporting embedded content to a controlling framework, which then schedules it for independent content-checking, has the advantage that the embedded data can be checked using a completely separate checker so that any faults arising in one checker are contained. However it has the disadvantage that there is a high overhead of moving data in and out of the framework and modification of data is difficult since the context of its location within its enclosing document is lost.

In both strategies, the content-checkers work on the original document data. They check that the complex data structures are valid and that the information they carry is acceptable.

A related technique is that of transcoding documents in which a document is translated from one format to another as it passes from one system to another. For example, a JPEG image might be converted to BMP. The purpose of this is to destroy any hidden information that might be encoded in the original document's data structures and to ensure that the delivered document is in a normal form that will be safely handled by the recipient application. An example of this approach is disclosed in patent publication WO 2005/085971A1 entitled "Threat mitigation in computer networks".

OBJECT OF THE INVENTION

The invention seeks to provide an alternative or improved method and apparatus for content-checking, in particular one which simplifies the critical element of a content-checker so that it can be trusted and implemented in hardware logic.

SUMMARY OF THE INVENTION

The present invention is directed to an approach of flattening structured documents containing embedded documents into a set of parts each of which can be checked individually, preferably in hardware, and reconstituting the document after checking.

In particular, according to a first aspect of the present invention there is provided a method of mitigating the effect of a security threats potentially contained in a digitally encoded document, the method comprising:
  determining whether the digitally encoded document contains any embedded documents;
  content-checking, by means of at least one hardware-implement content-checker, at least one of the embedded documents separately from those parts of the digitally encoded document within which it was embedded;
  releasing a version of the digitally encoded document responsive to the content-checking.

The use of a hardware implemented content-checkers mitigates the risk of the content-checker being compromised by a malicious attack. It also has the benefit of potentially performing the content-checks faster than if implemented in software. In the preset context the term "hardware" is intended to encompass not only custom designed circuitry but also programmed FPGA's, and any other such implementation.

In a further embodiment embedded documents are nested.

In a further embodiment the step of determining whether the digitally encoded document contains any embedded documents is performed recursively.

This facilitates content-checking of embedded documents nested to arbitrary depth.

In a further embodiment the content-checking of the at least one embedded document is performed on all embedded documents.

This ensures that all aspects of the document have been checked.

In a further embodiment content-checking of multiple embedded documents is arranged to be performed in parallel.

This allows distinct hardware content-checkers to be provided for distinct document types, thereby allowing simplification of the content checker for each type. It also provides, in a given embodiment, for multiple hardware content-checkers to be provided for the same document type thereby increasing the content-checking bandwidth for a given type. Overall this approach facilitates rapid content-checking of all parts of a given document.

In a further embodiment the method additionally comprises the step of: maintaining type information relating to embedded documents whereby pass at least one of the digitally encoded document and an embedded document responsive to the type information.

In a further embodiment content-checking of a document is performed responsive to an assessment as to whether the document was an embedded document or the un-embedded portion of the digitally encoded document.

In some cases the detailed structure of a given document type varies according to whether is the outermost document or an embedded document. By tracking which component was the outermost and which were originally embedded the appropriate content-check can be applied.

In a further embodiment documents are content-checked responsive to an indication whether all their embedded documents have already been content-checked.

In a further embodiment the documents are content-checked bottom-up.

This enables documents to be checked more efficiently insofar as content-checking of an "enclosing" document may be abandoned if, for example, a document originally embedded within it is rejected by its content-checker. It also means that once the "enclosing" document is checked work could commence on creating an output document portion comprising the "enclosing" document and its embedded documents.

In a further embodiment content-checking of a document is performed responsive to information representative of the type of one or more embedded documents originally embedded within it.

In a further embodiment the version of the original digitally encoded document released is a version modified with respect to the original digitally encoded document responsive to the content-checking.

This enables a document to be passed on even if a security problem is encountered in an embedded document, by modifying or removing affected portions, including substantially a whole embedded document.

The invention also provides for a system for the purposes of communications which comprises one or more instances of apparatus embodying the present invention, together with other additional apparatus.

In particular, according to a further aspect of the present invention there is provided apparatus comprising one or more components arrange to perform the methods of the first aspect.

The invention also provides for computer software in a machine-readable form and arranged, in operation, to carry out every function of the apparatus and/or methods.

In particular, according to a further aspect of the present invention there is provided a program for a computer comprising code portions arranged to perform the methods of the first aspect.

The preferred features may be combined as appropriate, as would be apparent to a skilled person, and may be combined with any of the aspects of the invention.

BRIEF DESCRIPTION OF THE DRAWINGS

In order to show how the invention may be carried into effect, embodiments of the invention are now described below by way of example only and with reference to the accompanying figures in which.

DETAILED DESCRIPTION OF INVENTION

Figure 1:
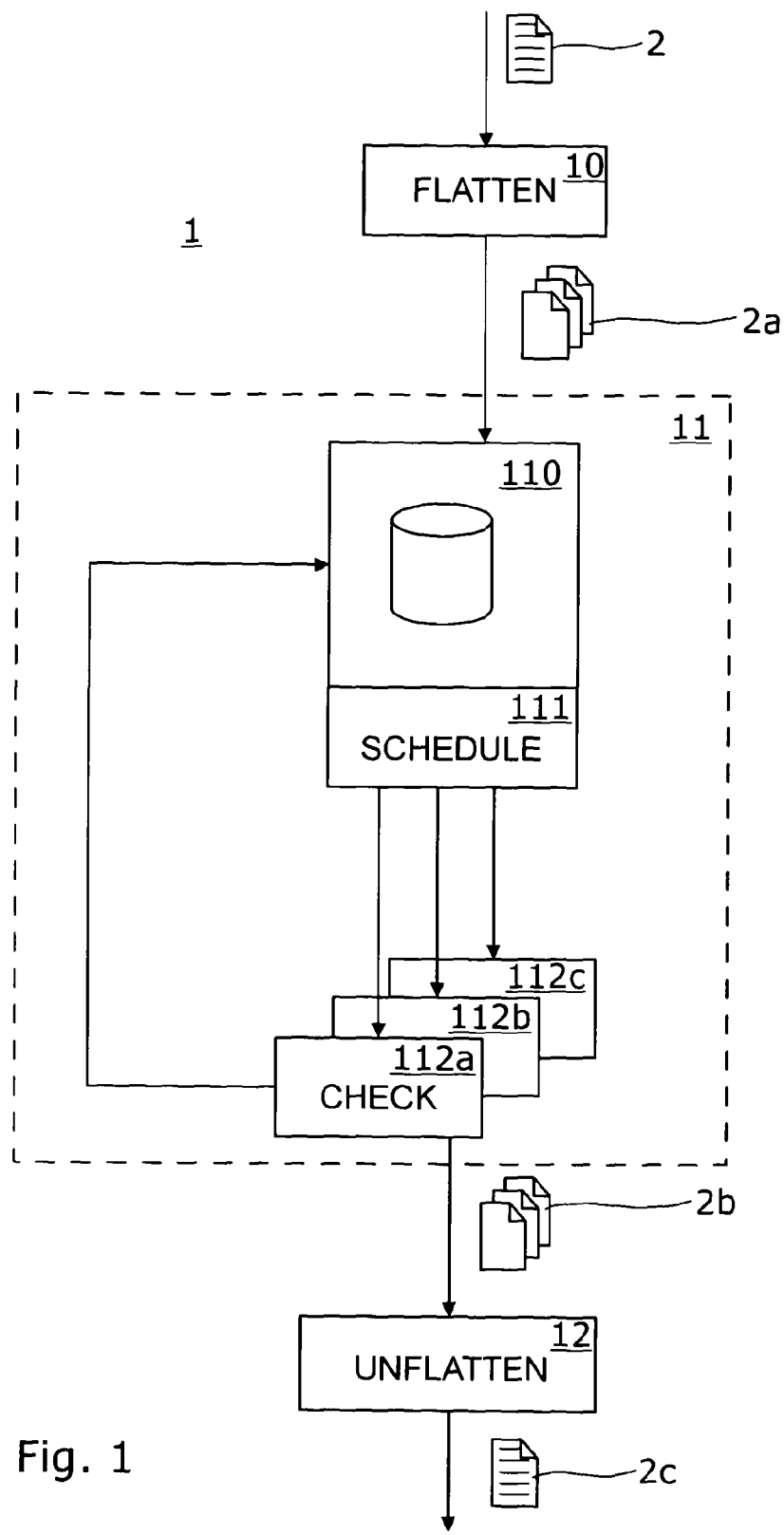
FIG. 1 shows a schematic diagram of a first content-checking method and apparatus in accordance with the present invention.
Figure 2:
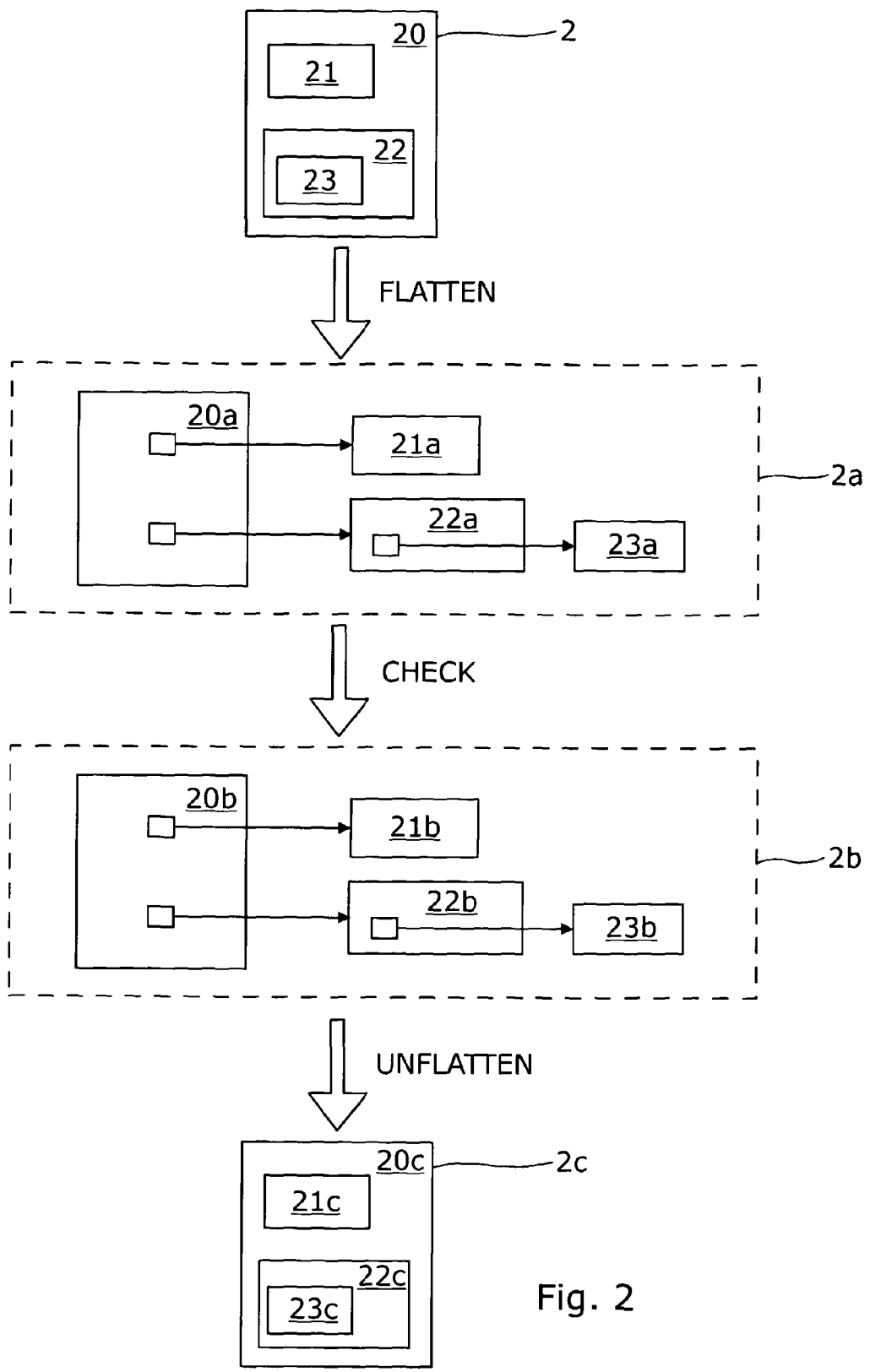
FIG. 2 shows another schematic diagram of an embodiment of a content-checking method in accordance with the present invention.

Referring now to FIGS. 1 and 2, a context-checking system 1 compromises a flattener 10, content-checker 11 and unflattener 12 sub-systems. Complexity in a content-checking system can be mitigated or avoided by pre-processing 10 the document data 2 to produce an alternative representation 2a of the data that is easier to check, rather than be optimal regards the use of disk space or application performance. Once checked, this simple representation can be converted back 12 to the original format 2 or a modified version 2c of the original.

In the embodiment shown the system is arranged, using well-known techniques, so that the conversion process 10 need not be trusted: that is, no failure of the conversion process can cause unchecked data, or data that fails the checks, to pass from one system to the other. For example, the conversion software 10 may be run on separate physical or virtual machines to the checker with the machines connected, physically or logically, in such a way that data cannot bypass the checker 11.

To avoid complexity handling embedded data, any such embedded content is extracted into a separate document that is referenced by the containing document. This process is applied recursively. Thus a single input digitally encoded document 2 is translated, in general, into a list 2a of parts 20a-23a which contain references to each other.

These references are such that the list of parts can be arranged into a tree structure which reflects the embedding. The parts in this list are then checked individually, using content-checkers 112a-c which have no need to handle embedded data. Once checked, the parts 20b-23b in the list are recombined into a single document 2c containing embedded data.

The references used to relate a container document to its embedded data may be based on a simple numbering scheme or by using cryptographic hashes of the data as short fixed length unique identifiers for the embedded data.

The checker 11 may modify the parts which it checks whereby to produce a modified set 2b of parts. For example, some data may be removed or altered in order to ensure the part satisfies some security constraint. However this is likely to add complexity to the check and this can usually be avoided by having the flattener 10, or a software-based modifying content-checker (not shown) make the changes and then the checker 11 need only confirm that the data is as required. For example, the hardware content checker may reject a Word document on the grounds that it contains a macro. The offending document part is then flagged to a software-based content checker which is configured to remove such macros. The modified 'macro-less' documents is then re-submitted to the hardware content checker. The hardware content checker would then now permits the release of the modified document which no longer contains offendeign macros. Even if the software-based content checker had been compromised and did not remove the macro, the hardware content checker would continue to reject the document.

Some content-checks may impose constraints on the properties of some embedded data, in particular the type of the embedded document. For example a spreadsheet may be allowed to contain an image but not contain a ZIP archive file. To support this requirement, the content-checker must be given some type information about the embedded documents referenced by the data it is checking.

This type information is produced by content-checking the embedded data, though other properties may also be relevant such as picture size. The type information can be stored as state 110 in the content-checker 11, so that the type of previously checked data is available when later documents are checked. However the introduction of state complicates the implementation and makes it more difficult to test thereby making it more difficult to trust.

The complexity of state in the checker can be avoided by separating the checker into two parts—a scheduler 111 which maintains type information and one or more data checkers 112*a-c* which are stateless. The scheduler maintains the list of parts that need to be checked and type information about the documents that have already been checked.

The data checkers are responsible for generating type information. This type information is passed back to the scheduler's store of information 110 to supply when checking further parts. The scheduler passes the next part to be checked to the checker along with the type information of parts already checked. Once a given part has been checked, and assuming the checks have passed, the part is sent onwards to the unflattener 12 and the type information is stored back in the scheduler's store.

The parts 20*a*-23*a* may be checked in depth-first or bottom-up order with respect to the structuring of the embedding: that is, an embedded part is checked before the part that contains it, hence the outer level document part is checked last.

Note that the architecture is arranged so that trust in the scheduler can be minimised. It is responsible for ensuring that the correct type information is passed to the checker, but it cannot cause data to be sent to the unflattener without it passing through the checker.

One particular aspect to address is how the flattener knows that it has received all the parts making up a given document. Another issue is that the content-checkers may apply different checks to parts which are embedded data and the outer level document part: for example, the format of an Excel spreadsheet that is embedded in another document is slightly different to a standalone spreadsheet, thus the checks that must be applied are slightly different. These two issues can both addressed by flagging the outer level document part as being special, or flagging the embedded parts, or both.

In one embodiment the outer level document part is always checked last so, once the unflattener receives a document part identifiable as the outer level document, it knows it can reconstitute the document and pass it on. The flag or flags are attached to the parts passing through the checker so that the checker can apply different checks according to whether the part is the outer level one.

Any range or device value given herein may be extended or altered without losing the effect sought, as will be apparent to the skilled person for an understanding of the teachings herein.

The invention claimed is:

1. A method of mitigating the effect of a security threats potentially contained in a digitally encoded document, the method comprising:
   determining whether the digitally encoded document contains any embedded documents;
   extracting embedded content into a separate document, such that a single input digital encoded document is translated into parts which contain references to one another;
   content-checking, by means of at least one hardware-implement content-checker, at least one of the embedded documents separately from those parts of the digitally encoded document within which it was embedded;
   recombining at least some of the parts of the extracted embedded content into the digitally encoded document using the references contained therein; and
   releasing a version of the digitally encoded document responsive to the content-checking 2. A method according to claim 1 in which embedded documents are nested.

3. A method according to claim 1 in which the step of determining whether the digitally encoded document contains any embedded documents is performed recursively.

4. A method according to claim 1 in which the content-checking of the at least one embedded document is performed on all embedded documents.

5. A method according to claim 1 in which content-checking of multiple embedded documents is arranged to be performed in parallel.

6. A method according to claim 1 in which content-checking of a document is performed responsive to an assessment as to whether the document was an embedded document or the un-embedded portion of the digitally encoded document.

7. A method according to claim 1 in which documents are content-checked responsive to an indication whether all their embedded documents have already been content-checked.

8. A method according to claim 1 in which the documents are content-checked bottom-up.

9. A method according to claim 1 in which content-checking of a document is performed responsive to information representative of the type of one or more embedded documents originally embedded within it.

10. A method according to claim 1 in which the version of the original digitally encoded document released is a version modified with respect to the original digitally encoded document responsive to the content-checking.

11. Apparatus comprising a computer arranged to perform the steps of:
   determining whether the digitally encoded document contains any embedded documents;
   extracting embedded content into a separate document, such that a single input digital encoded document is translated into parts which contain references to one another;
   content-checking, by means of at least one hardware-implement content-checker, at least one of the embedded documents separately from those parts of the digitally encoded document within which it was embedded;
   recombining at least some of the parts of the extracted embedded content into the digitally encoded document using the references contained therein; and
   releasing a version of the digitally encoded document responsive to the content-checking.

12. A non-transitory computer readable medium including code portions arranged to perform a method comprising the steps of:
   determining whether the digitally encoded document contains any embedded documents;
   extracting embedded content into a separate document, such that a single input digital encoded document is translated into parts which contain references to one another;

content-checking, by means of at least one hardware-implement content-checker, at least one of the embedded documents separately from those parts of the digitally encoded document within which it was embedded;
recombining at least some of the parts of the extracted embedded content into the digitally encoded document using the references contained therein; and
releasing a version of the digitally encoded document responsive to the content-checking.

\* \* \* \* \*